United States Patent
Hicks et al.

(10) Patent No.: US 9,454,359 B2
(45) Date of Patent: Sep. 27, 2016

(54) DEPLOYMENT OPTIMIZATION FOR HIGH AVAILABILITY IN A MULTI-TENANT PLATFORM-AS-A-SERVICE (PAAS) SYSTEM

(71) Applicant: Red Hat, Inc., Raleigh, NC (US)

(72) Inventors: Matthew Hicks, Westford, MA (US); Michael P. McGrath, Schaumburg, IL (US); Daniel McPherson, Raleigh, NC (US); Jhon Honce, Cave Creek, AZ (US)

(73) Assignee: Red Hat, Inc., Raleigh, NC (US)

( * ) Notice: Subject to any disclaimer, the term of this patent is extended or adjusted under 35 U.S.C. 154(b) by 181 days.

(21) Appl. No.: 13/751,233

(22) Filed: Jan. 28, 2013

(65) Prior Publication Data

US 2014/0215452 A1    Jul. 31, 2014

(51) Int. Cl.
  G06F 9/44    (2006.01)
  G06F 9/455   (2006.01)
  G06F 9/445   (2006.01)

(52) U.S. Cl.
  CPC . G06F 8/67 (2013.01); G06F 8/71 (2013.01); G06F 9/45504 (2013.01)

(58) Field of Classification Search
  CPC .............. G06F 8/65; G06F 8/67–8/68; G06F 9/45554; H04L 67/34
  USPC ......................................................... 717/172
  See application file for complete search history.

(56) References Cited

U.S. PATENT DOCUMENTS 8,458,392 B2 *  6/2013  Gao et al. ......................... 711/6
8,601,467 B2 * 12/2013  Hofhansl et al. ............. 717/177
2010/0299664 A1 * 11/2010 Taylor et al. .................. 717/173
2011/0321024 A1 * 12/2011 Knothe et al. ................ 717/168
2012/0030666 A1 *  2/2012 Laicher et al. ............... 717/173
2012/0180039 A1 *  7/2012 Bravery et al. ............... 717/178
2012/0266156 A1 * 10/2012 Spivak et al. ................ 717/172
2012/0266158 A1 * 10/2012 Spivak et al. ................ 717/175
2013/0254755 A1 *  9/2013 Yousouf et al. .............. 717/170
2014/0130036 A1 *  5/2014 Gurikar et al. ............... 717/176
2014/0157264 A1 *  6/2014 Russinovich et al. ........... 718/1

OTHER PUBLICATIONS

Almond et al., "Multitenant Utility Computing on IBM Power Systems Running AIX", ibm.com/redbooks, Feb. 2009, 304pg.*

(Continued)

*Primary Examiner* — Ryan Coyer
(74) *Attorney, Agent, or Firm* — Lowenstein Sandler LLP

(57) ABSTRACT

A mechanism for deployment optimization in a multi-tenant Platform-as-a-Service (PaaS) system is disclosed. A method of the disclosure includes receiving, at a source code management (SCM) repository maintained by a node executing on a computing device, updated application code of an application executed on the node, wherein the node is provided by a multi-tenant Platform-as-a-Service (PaaS) system, providing, by the node, the updated application code to one or more cartridge instances that implement framework of the application, determining, by each of the one or more cartridge instances, that a marker file is present in the updated application code, the marker file indicating that hot deployment functionality is to be implemented for the application, and implementing, by each of the one or more cartridge instances using hot deployment functionality that is specific to the cartridge instance, code changes in the updated application code without a restart of the application.

20 Claims, 5 Drawing Sheets

(56) References Cited

OTHER PUBLICATIONS

Anonymous, "Method and apparatus for event-driven software distribution in a cloud-computing infrastructure", IPCOM000208828D, Jul. 2011, 4pg.*

Anonymous, "System and method for providing multi-tenancy in cloud environment using OSGi services", IPCOM000205874D, Apr. 2011, 6pg.*

IBM, "Method and apparatus for automated configuration and deployment of multi-tenant software applications", IPCOM000181812D, Apr. 2009, 5pg.*

* cited by examiner

US 9,454,359 B2

DEPLOYMENT OPTIMIZATION FOR HIGH AVAILABILITY IN A MULTI-TENANT PLATFORM-AS-A-SERVICE (PAAS) SYSTEM

TECHNICAL FIELD

The embodiments of the disclosure relate generally to platform-as-a-service environments and, more specifically, relate to deployment optimization for high availability in a multi-tenant PaaS system.

BACKGROUND

Currently, a variety of Platform-as-a-Service (PaaS) offerings exist that include software and/or hardware facilities for facilitating the execution of web applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware and software and provisioning hosting capabilities, providing the facilities to support the complete life cycle of building and delivering web application and service entirely available from the Internet. Typically, these facilities operate as one or more virtual machines (VMs) running on top of a hypervisor in a host server.

When making code modifications to an application running on a PaaS offering, the PaaS platform generally stops, builds, deploys, and restarts the application to implement the code changes. This entire process takes time to complete and is unnecessary for many types of code changes.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for a mechanism for deployment optimization for high availability in a multi-tenant PaaS system. The deployment optimization described in embodiments of the disclosure may provide support for no down time application changes in a PaaS system without impacting users and across a broad range of technologies and languages supported by the PaaS system. In one embodiment, when a software developer or end user deploying an application on the PaaS system makes a code change, they may provide the updated code to the PaaS environment. Embodiments of the disclosure introduce functionality to support high availability/no down time of the application while the code changes are introduced to the application.

In one embodiment, hot deployment support is provided via a marker file that is added to the repository for the application. The marker file may include an empty file that is labeled as a "marker" to indicate to a controller component that the application is to be deployed using a hot deploy functionality. When a cartridge (e.g., a form of support software (or middleware) providing functionality (such as configuration templates, scripts, dependencies) to run an application and/or add a feature to an application) of the application identifies this marker file, the cartridge implements hot deployment functionality for the particular cartridge so that the application is not brought down while the code is being updated. Hot deployment of an application allows for code changes to take effect without restarting the application cartridge, thus increasing deployment speed and minimizing application downtime. In other embodiments, mechanisms other than a marker file trigger the hot deployment, such as an environmental variable or any other trigger mechanism. An environmental variable may include a dynamic named value that can affect the way running processes behave on a computer system.

In one embodiment, a method of the disclosure includes receiving, at a source code management (SCM) repository maintained by a node executing on a computing device, updated application code of an application executed on the node, wherein the node is provided by a multi-tenant Platform-as-a-Service (PaaS) system. The method also includes providing, by the node, the updated application code to one or more cartridge instances that implement framework of the application. In addition, the method includes determining, by each of the one or more cartridge instances, that a marker file is present in the updated application code, the marker file indicating that hot deployment functionality is to be implemented for the application. The method may then implement, by each of the one or more cartridge instances using hot deployment functionality that is specific to the cartridge instance, code changes in the updated application code without a restart of the application.

Figure 1:
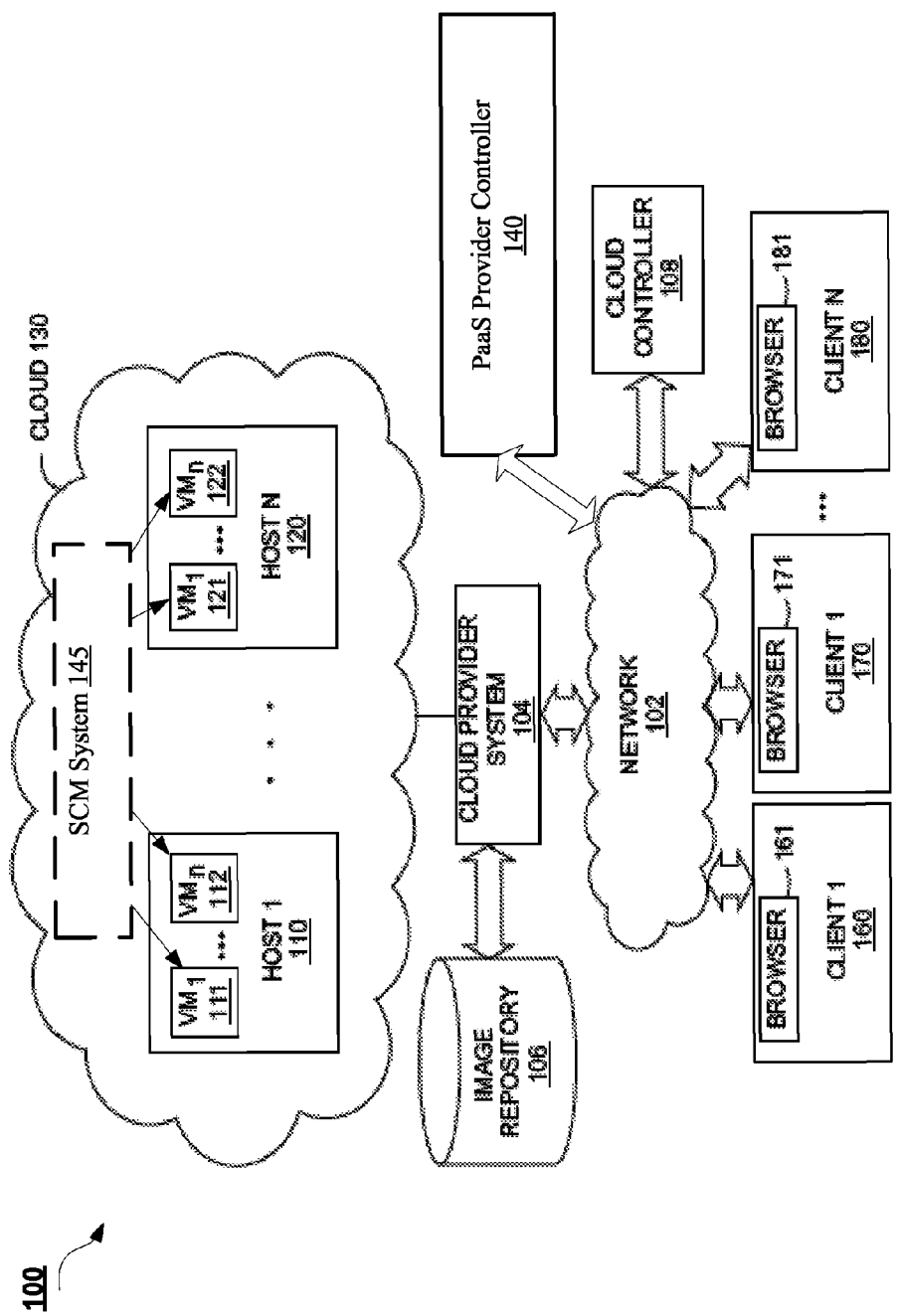
FIG. 1 is a block diagram of a network architecture in which embodiments of the disclosure may operate.

FIG. 1 is a block diagram of a network architecture 100 in which embodiments of the disclosure may operate. The network architecture 100 includes a cloud 130 managed by a cloud provider system 104. The cloud provider system 104 provides VMs, such as VMs 111, 112, 121, and 122 hosted in cloud 130. Each VM is hosted on a physical machine, such as host 1 110 through host N 120, configured as part of the cloud 130. In some embodiments, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181.

Clients 160, 170 and 180 are connected to hosts 110, 120 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In some embodiments, cloud controller 108 receives commands from PaaS provider controller 140. Based on these commands, the cloud controller 108 provides data (e.g., such as pre-generated images) associated with different applications to the cloud provider system 104. In some embodiments, the data may be provided to the cloud provider 104 and stored in an image repository 106, in an image repository (not shown) located on each host 110, 120, or in an image repository (not shown) located on each VM 111, 112, 121, 122.

In one embodiment, each VM 111, 112, 121, 122 running applications for the PaaS provider controller 140 includes a source code management (SCM) system 145, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. SCM system 145 on VMs 111, 112, 121, 122 stores the remote repositories for each application running on the VM 111, 112, 121, 122, so that the application code may be edited by others with access, or the application may be executed by the VM 111, 112, 121, 122.

In one embodiment, the application code pushed to the remote repositories of SCM system 145 may include a marker file that indicates that hot deployment functionality should be implemented for the applications having the marker file in their remote repository. Hot deployment functionality may refer to an ability to make changes to an application without restarting the application. This increases deployment speed and minimizes application downtime. Further details of the hot deployment functionality for PaaS systems are described below with respect to FIGS. 2 and 3.

While various embodiments are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
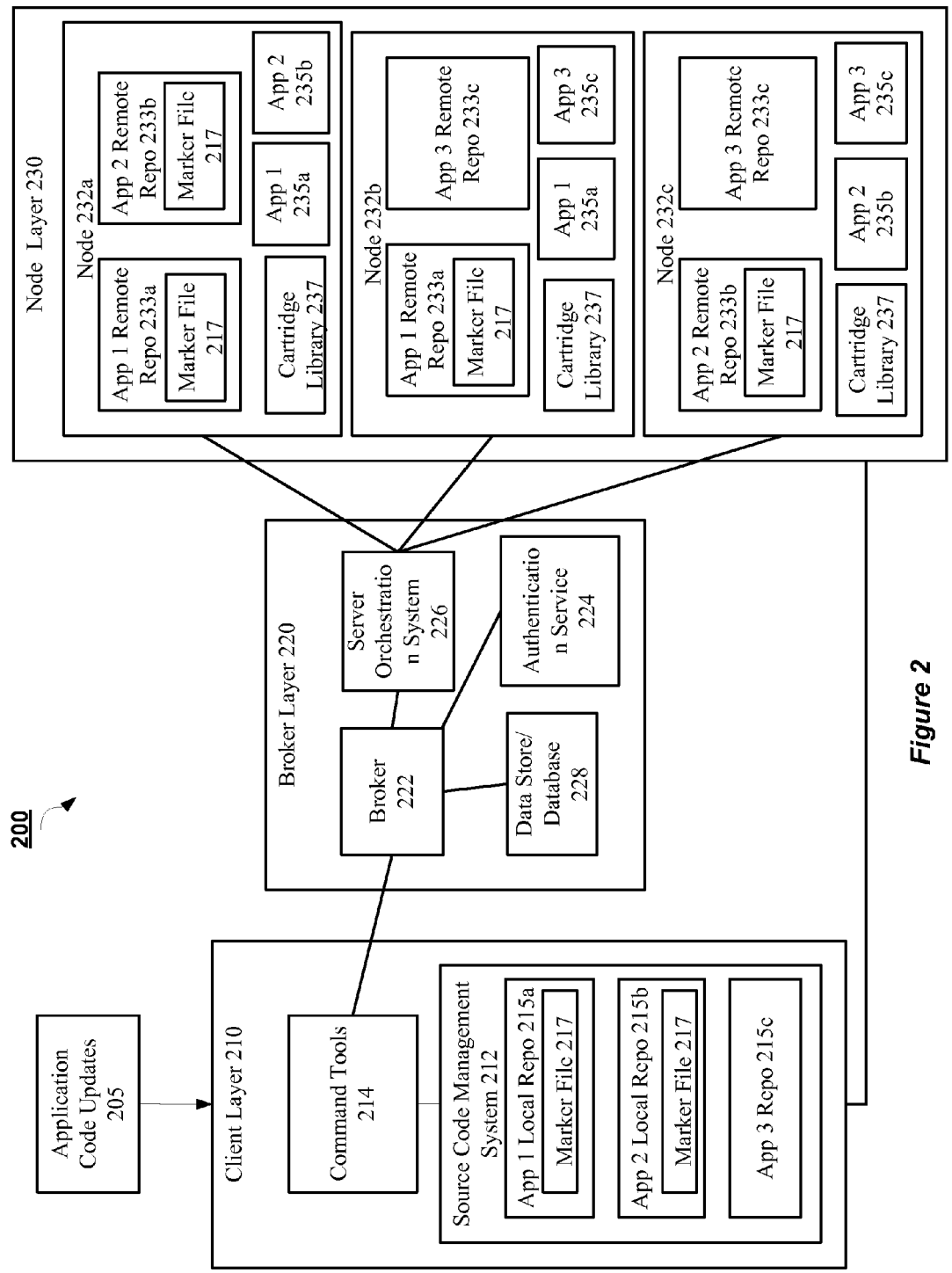
FIG. 2 is a block diagram of a PaaS system architecture according to an embodiment of the disclosure.

FIG. 2 is a block diagram of a PaaS system architecture 200 according to an embodiment of the disclosure. The PaaS architecture 200 allows users to launch software applications in a cloud computing environment, such as cloud computing environment provided in network architecture 100 described with respect to FIG. 1. The PaaS system architecture 200, in one embodiment, includes a client layer 210, a broker layer 220, and a node layer 230.

In one embodiment, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one embodiment, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository 215a, 215b, 215c for storing the changes for each application associated with the end user of the PaaS system 200. The packaged software application can then be "pushed" from the local SCM repository 215a, 215b, 215c to a remote SCM repository 233a, 233b, 233c at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one embodiment, also includes a set of command tools 214 that a user can utilize to create, launch, and manage applications. In one embodiment, the command tools 214 can be downloaded and installed on the user's client machine, and can be accessed via a command line interface or a graphical user interface, or some other type of interface. In one embodiment, the command tools 214 expose an application programming interface ("API") of the broker layer 220 and perform other applications management tasks in an automated fashion using other interfaces, as will be described in more detail further below in accordance with some embodiments.

In one embodiment, the broker layer 220 acts as middleware between the client layer 210 and the node layer 230. The node layer 230 includes the nodes 232a-c on which software applications 235a-c are provisioned and executed. In one embodiment, each node 232a-c is a VM provisioned by an Infrastructure as a Service (IaaS) provider, such as Amazon™ Web Services. In other embodiments, the nodes 232a-c may be physical machines or VMs residing on a single physical machine. In one embodiment, the broker layer 220 is implemented on one or more machines, such as server computers, desktop computers, etc. In some embodiments, the broker layer 220 may be implemented on one or more machines separate from machines implementing each of the client layer 210 and the node layer 230, or may implemented together with the client layer 210 and/or the node layer 230 on one or more machines, or some combination of the above.

In one embodiment, the broker layer 220 includes a broker 222 that coordinates requests from the client layer 210 with actions to be performed at the node layer 230. One such request is new application creation. In one embodiment, when a user, using the command tools 214 at client layer 210, requests the creation of a new application 235a-c, or some other action to manage the application 235a-c, the broker 222 first authenticates the user using an authentication service 224. In one embodiment, the authentication service may comprise custom authentication methods, or standard protocols such as SAML, Oauth, etc. Once the user has been authenticated and allowed access to the system by authentication service 224, the broker 222 uses a server orchestration system 226 to collect information and configuration information about the nodes 232a-c.

In one embodiment, the broker 222 uses the Marionette Collective™ ("MCollective™") framework available from Puppet Labs™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232a-c, which are acting as application servers and web servers.

For example, if the broker 222 wanted to shut down all applications 235a-c on all even numbered nodes out of 100,000 nodes, the broker 222 may provide one command to the server orchestration system 226. Then, the server orchestration system 226 would generate and distribute a message to all nodes 232a-c to shut down all applications 235a-c if the node 232a-c is even, using a messaging and queuing system. Thus, in one embodiment, the broker 222 manages the business logic and model representing the nodes 232a-c and the applications 235a-c residing on the nodes, and acts as a controller that generates the actions requested by users via an API of the client tools 214. The server orchestration system 226 then takes the actions generated by the broker 222 and orchestrates their execution on the many nodes 232a-c managed by the system.

In one embodiment, the information collected about the nodes 232a-c can be stored in a data store 228. In one embodiment, the data store 228 can be a locally-hosted database or file store, or it can be a cloud based storage service provided by a Software-as-a-Service (SaaS) provider, such as Amazon™ S3™ (Simple Storage Service). The broker 222 uses the information about the nodes 232a-c and their applications 235a-c to model the application hosting service and to maintain records about the nodes. In one embodiment, data of a node 232a-c is stored in the form of a JavaScript Object Notation (JSON) blob or string that maintains key-value pairs to associate a unique identifier, a hostname, a list of applications, and other such attributes with the node.

In embodiments of the disclosure, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 (VM) that is hosting the first customer's deployed applications 235a-c. In some embodiments, portions of an application are run on multiple different nodes 232a-c. For example, as shown in FIG. 2, components of application 1 235a are run in both node 232a and node 232b. Similarly, application 2 235b is run in node 232a and node 232c, while application 3 235c is run in node 232b and node 232c.

In addition, each node also maintains a cartridge library 237. The cartridge library 237 maintains multiple software components (referred to herein as cartridges) that may be utilized by applications 235a-c deployed on node 232a-c. A cartridge can represent a form of support software (or middleware) providing the functionality, such as configuration templates, scripts, dependencies, to run an application 235a-c and/or add a feature to an application, 235a-c. In one embodiment, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance of a cartridge from cartridge library 237 to an application 235a-c provides a capability for the application 235a-c, without the customer who owns the application having to administer or update the included capability.

In embodiments of the disclosure, an end user of PaaS system 200 may provide application code updates 205 to one or more applications 235a, 235b, 235c of the end user hosted by PaaS system 200. The application code updates may include a marker file 217 that indicates the application 235a, 235b, 235c is to be deployed using a hot deploy functionality. In other embodiments, mechanisms other than a marker file trigger the hot deployment, such as an environmental variable or any other trigger mechanism.

In one embodiment, hot deployment functionality refers to an ability to make changes to an application without restarting the application. The end user may add the marker file 217 as part of code changes made to an application 235a, 235b, 235c, or as part of the initial creation of the application 235a, 235b, 235c, and then store those changes in the local SCM repository 215a, 215b, 215c associated with the application 235a, 235b, 235c. As illustrated in FIG. 2, application 1 235a and 235B have a marker file 217 associated with the application, while application 235c does not. However, different arrangements of associations between marker files 217 and applications 235a, 235b, 235c are possible.

The packaged software application, including the marker file 217, can then be provided (e.g., "pushed") from the local SCM repository 215a, 215b, 215c to a remote SCM repository 233a. In some embodiments, there is a remote SCM repository 233a, 233b, 233c on each node 232a, 232b, 232c that the application 235a, 235b, 23c executes. The remote SCM repositories 233a, 233b, 233c stores application for editing and/or for execution on the node 232a, 232b, 232c.

In one embodiment, when the marker file 217 is part of the application code pushed to the remote SCM repositories 233a, 233b, 233c, it indicates to cartridges providing application framework for the application that the cartridges should each provide hot deployment functionality for the applications so that the application does not have to be restarted. The marker file acts as a single indication that may invoke a hot deployment functionality across a variety of different cartridge types that an application may run, irrespective of the type of cartridge. As a result, an end user of the PaaS platform does not have to be aware of or implement the specific functionality for providing hot deployment in each cartridge instance type that provides the framework for the application. Instead, the user may add the marker file to the application code and the PaaS platform 200 takes care of the hot deployment functionality implementation.

In some embodiments, an automatic determination (i.e., without a marker file) of whether a hot deployment should occur is implemented. For example, if the server is running in development mode and only the application code has been changed, the system may infer a hot deployment is possible and cause hot deployment functionality to be implemented.

Figure 3:
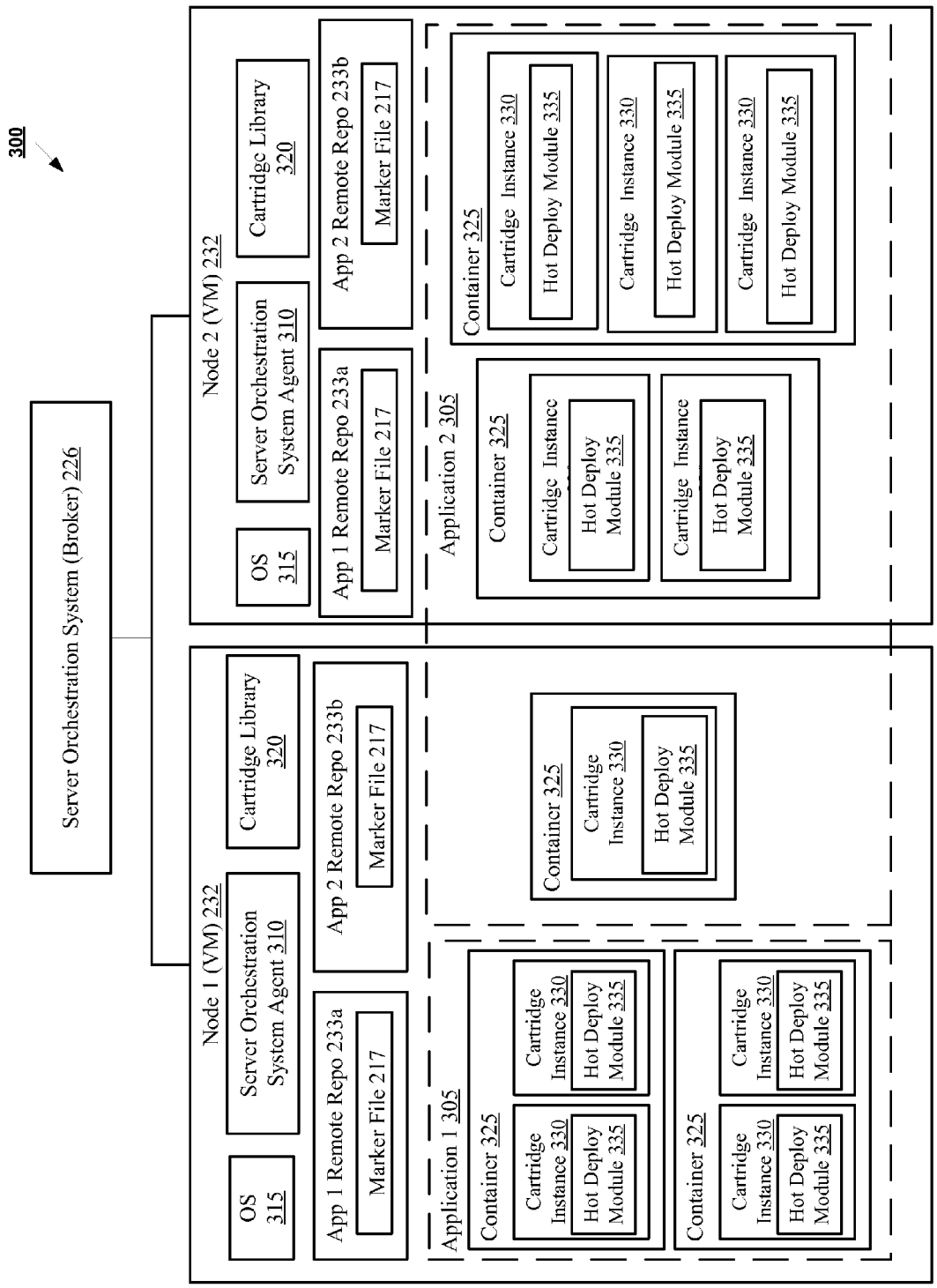
FIG. 3 is a block diagram of depicting a communication infrastructure between a server orchestration system and a plurality of nodes according to embodiments of the disclosure.

FIG. 3 is a block diagram depicting a communication infrastructure 300 between a server orchestration system 226 and a plurality of nodes 232 according to embodiments of the disclosure. In one embodiment, server orchestration system 226 and nodes 232 are the same as their counterparts described with respect to FIG. 2. In one embodiment, each node 232 is implemented as a VM and has an operating system 315 that can execute applications 305 using the cartridge library 320 that are resident on the nodes 232. In one embodiment, applications 305 are the same as applications 235a-c described with respect to FIG. 2.

Each node 232 also includes a server orchestration system agent 310 configured to track and collect information about the node 232 and to perform management actions on the node 232. Thus, in one embodiment, using MCollective™ as the server orchestration system 226, the server orchestration system agent 310 can act as a MCollective™ server. The server orchestration system 226 would then act as the MCollective™ client that can send requests, queries, and commands to the MCollective™ server on node 232.

As previously mentioned, cartridges provide the underlying support software that implements the functionality of applications 305. In one embodiment, an application 305 may utilize one or more cartridge instances 330 that are run in one or more resource-constrained containers 325 on nodes 232. Cartridge library 320 provides an OS 315-based location, outside of all application containers 325, that acts as a source for cartridge instantiations 330 that provide functionality for an application 305. An application 305 may use more than one cartridge instance 330 as part of providing functionality for the application 305. One example of this is a JavaEE application that uses a JBoss™ AS7 cartridge with a supporting MySQL™ database provided by a MySQL™ cartridge. Each cartridge instance may include a software repository that provides the particular functionality of the cartridge instance 330.

A container 325 is a resource-constrained process space on the node 232 to execute functionality of an application. In some embodiments, a container 325 is established by the node 232 with resource boundaries, including a limit and/or designation of the amount of memory, amount of storage, and security types and/or labels to be applied to any functions executed by the container 325. In one embodiment, containers 325 may be established using the Linux Containers (LXC) virtualization method. In further embodiments, containers may also be established using cgroups, SELinux™, and kernel namespaces, to name a few examples.

In some embodiments, a container 325 is also known as a gear. In some embodiments, cartridges instances 330 for an application 305 may execute in containers 325 dispersed over more than one node 232, as shown with application 2 305 illustrated in FIG. 3. In other embodiments, cartridge instances 330 for an application 305 may run in one or more containers 325 on the same node 232, as shown with application 1 in FIG. 3.

Nodes 232 may also include remote SCM repositories 233a, 233b for each application 305 running on the node 232. The remote SM repositories 233a, 233b are the same as their counterparts described with respect to FIG. 2. In one embodiment, when application code changes are received (e.g., via a 'push' operation) in an application's remote SCM repository 233a, 233b, the remote SCM repository 233a, 233b invokes cartridge library 320 to run a number of hooks to build and configure the application. In one embodiment, a hook is code that handles intercepted function calls, events, or messages passed between software components.

For example, in the case of a git SCM system, a pre-receive git hook is setup on the remote Git repository 233a, 233b that calls into cartridges hooks associated with the cartridges 330 providing the framework for the application 305. The cartridge hooks manage the build and deployment of the application 305, including how to interpret the marker file 217 included with the code changes. As previously discussed, the marker file 217 indicates that the application should implement hot deployment functionality to prevent the application from restarting upon receiving code changes. Depending on the type of cartridge instance 330 running, different functionality may be invoked to implement hot deployment at the cartridge instance 330. In one embodiment, the functionality to implement hot deployment for the cartridge instance 330 is represented at hot deploy module 335. The cartridge instances 330 themselves implement the approach that is right for their use case. The overall cartridge instance 330 framework provides many helpers and common functions to each the hot deployment implementations, but each cartridge instance 330 type also provides specific of how the hot deployment should occur.

The following are some examples of hot deploy implementations for different cartridge types that may be part of a PaaS system. However, these examples are not meant to be limited to embodiments of the disclosure. In the case of a JBoss™ cartridge type, a JBoss HDScanner may identify any modifications and redeploys them. If previously deployed artifacts are removed as part of the update, they are undeployed automatically. In the case of a PHP™ or Perl™ cartridge type, the application code is built (dependencies are processed and user build action_hooks are run) and deployed to the application 305. However, the application 305 does not restart. This is true for Jenkins™ and non-Jenkins™ enabled applications. For Jenkins™-enabled applications, the build may be performed on a Jenkins™ slave instance and then synchronized to the containers 325 where the application 305 is running. For the case of a Ruby™ cartridge type, the Passenger restart.txt file is touched, causing the application 305 to serve new code without a full restart of application 305.

Figure 4:
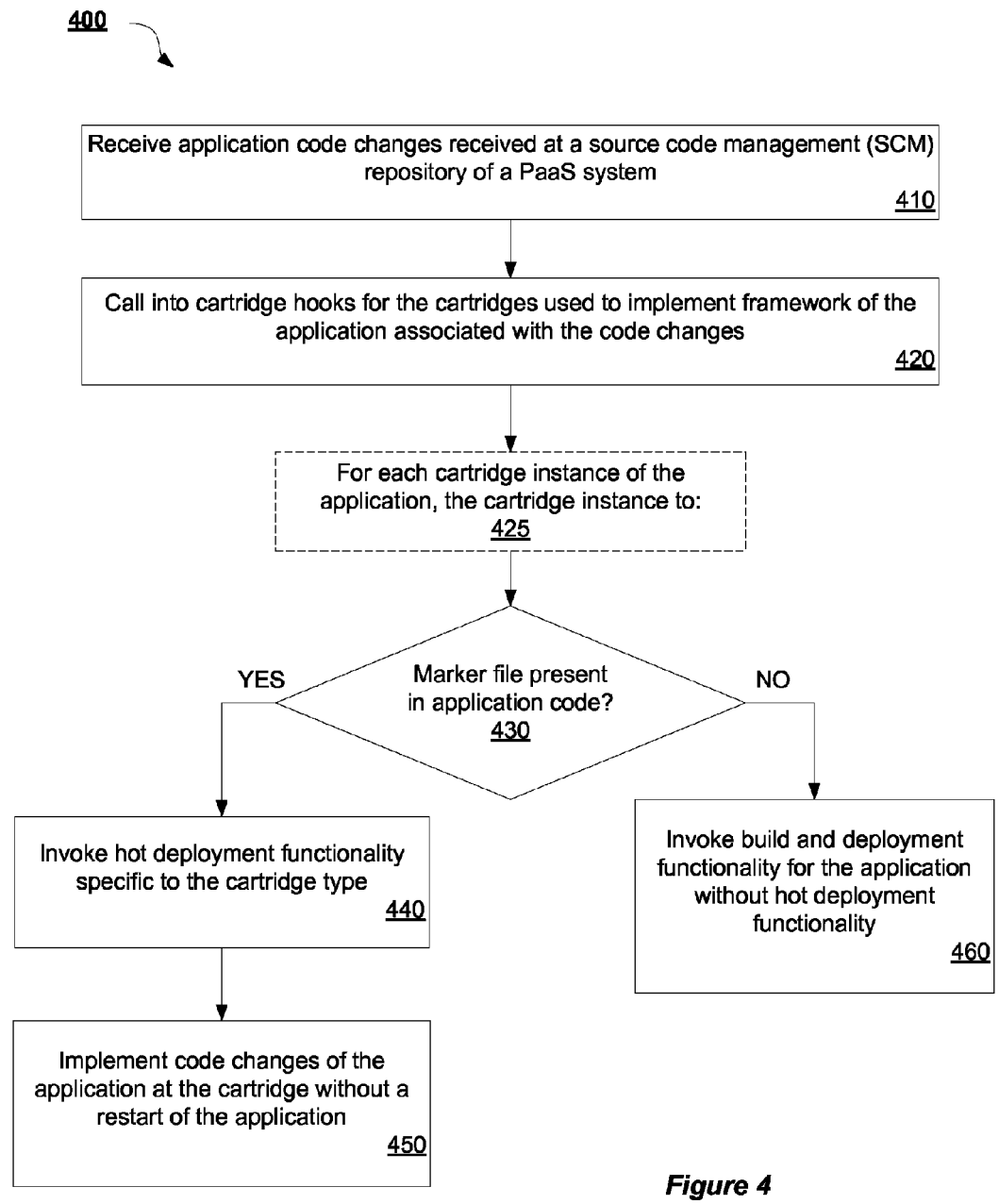
FIG. 4 is a flow diagram illustrating a method for a deployment optimization in a multi-tenant PaaS system according to an embodiment of the disclosure.

FIG. 4 is a flow diagram illustrating a method 400 for a deployment optimization in a multi-tenant PaaS system according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by nodes 232 described with respect to FIGS. 2 and 3.

Method 400 begins at block 410, where application code changes are received at an SCM repository of a PaaS system. In one embodiment, the SCM repository is a git remote repository maintained on a node of a multi-tenant PaaS system. The application changes may be provided via a git push command from an end user, sending the application code from the end user's local git repository to the remote git repository at the node. In some embodiments, if an application associated with the code changes is implemented over multiple nodes in the PaaS system, the application code changes are provided to remote SCM repositories on the multiple nodes.

At block 420, the SCM repository invokes one or more cartridges of the application affected by the application code changes once the application code changes are received. The cartridges are invoked by calling into cartridge hooks of cartridge instances used to provide a framework for the application on the node. At each cartridge instance of the application (block 425), the cartridge instance determines whether a marker file is present in the updated application code at decision block 430. In one embodiment, a marker file is a file added by the end user to the application code that indicates a hot deployment functionality should be utilized for application updates.

If so, at block 440, the cartridge instance invokes hot deployment functionality that is specific to the cartridge type. For example, a JBoss™ cartridge instance type implements JBoss™-dependent code for hot deployment that allows code changes to be made to the application without restarting the cartridge and/or application. Similarly, a PHP™ or Perl™ cartridge instance type provides a different, yet cartridge-dependent, hot deployment functionality that allows code changes to the made to the application without restarting the cartridge instance and/or application, and so on. Accordingly, at block 450, codes changes of the application are implemented at the cartridge instance without a restart of the application.

On the other hand, if a marker file is not present in the updated application code at decision block 430, method 400 proceeds to block 460, where build and deployment functionality for the application are invoked by the cartridge instance without a hot deployment functionality. In other words, the application code changes are implemented, and may include a restart of the cartridge and/or application.

Figure 5:
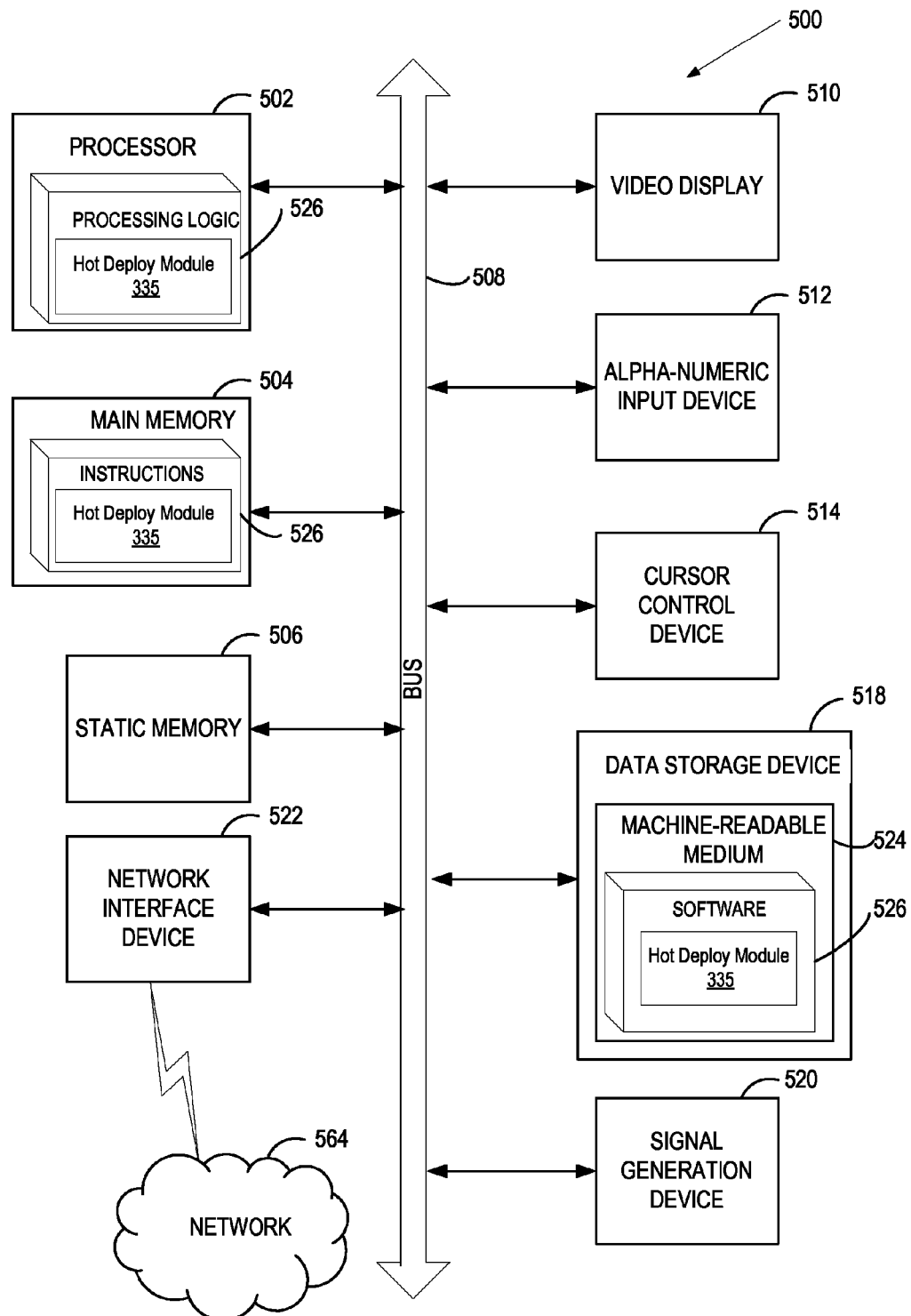
FIG. 5 illustrates a block diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 includes a processing device 502 (e.g., processor, CPU, etc.), a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 522 communicably coupled to a network 564. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 to implement a hot deploy module to perform deployment optimization in a multi-tenant PaaS system, such as the hot deploy module 335 described with respect to FIG. 3, and/or a software library containing methods that call the above applications. While the machine-accessible storage medium 524 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "providing", "implementing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
receiving, by a processing device executing a virtual machine (VM) of a multi-tenant Platform-as-a-Service (PaaS) system, updated application code of an application executed on the VM, the updated application code sent to a source code management (SCM) repository maintained at the VM, wherein the VM hosts multiple applications that are each owned by different owners;

providing, by the processing device, the updated application code to a cartridge instance that implements framework of the application on the VM, wherein the cartridge instance provides at least one of configuration templates, configuration scripts, or dependencies to execute source code of the application on the VM and wherein the cartridge instance is deployed on the VM from a master cartridge maintained by the multi-tenant PaaS;

determining, by the processing device via the cartridge instance, that a marker file is present in the updated application code, the marker file indicating that hot deployment functionality is to be implemented for the application; and implementing, by the processing device using the hot deployment functionality that is specific to the cartridge instance, code changes in the updated application code without a restart of the application.

2. The method of claim 1, wherein the providing the updated application code to the cartridge instance further comprises calling into cartridge hooks for the cartridge instance.

3. The method of claim 1, wherein the cartridge instance comprises at least one of a JBoss™ cartridge type, a PHP™ cartridge type, a Perl™ cartridge type, or a Ruby™ cartridge type.

4. The method of claim 3, wherein in response to the cartridge instance being the JBoss™ cartridge type, the hot deployment functionality comprises a JBoss™ HDScanner to:
identify the codes changes and redeploys the code changes in the application; and
when previously-deployed artifacts are removed as part of the code changes, undeploy the previously-deployed artifacts.

5. The method of claim 1, wherein in response to the cartridge instance being the PHP™ cartridge type or the Perl™ cartridge type, the hot deployment functionality comprises:
building the updated application code by processing dependencies and running user build action hooks; and
deploying the built updated application code to the application without restarting the application.

6. The method of claim 1, wherein in response to the cartridge instance being the Ruby™ cartridge type, the hot deployment functionality comprises accessing a Passenger™ restart.txt file and causing the application to serve the code changes without restarting the application.

7. The method of claim 1, wherein in response to the marker file being not present in the updated application code, invoking, by the cartridge instance, build functionality and deployment functionality to implement the code changes without the hot deployment functionality.

8. A system, comprising:
a memory;
a processing device communicably coupled to the memory, the processing device to execute a virtual machine (VM) to virtualize the resources of the memory and the processing device, the VM comprising a source code management (SCM) and a cartridge library, and wherein the processing device is to:
cause the VM to execute a plurality of applications for a multi-tenant Platform-as-a-Service (PaaS) system, wherein the plurality of applications are executed on the VM and wherein each of the plurality of applications are owned by different owners;

receive, at a repository of the SCM associated with the application, updated application code for the application;

provide the updated application code to a cartridge instance invoked from a master cartridge maintained in the cartridge library, the cartridge instance implementing a framework of the application on the VM, wherein the cartridge instance provides at least one of configuration templates, configuration scripts, or dependencies to execute source code of the application on the VM and wherein the cartridge instance is deployed on the VM from a master cartridge maintained by the multi-tenant PaaS;

determine, via the cartridge instance, that a marker file is present in the updated application code, the marker file indicating that hot deployment functionality is to be implemented for the application; and implement, using the hot deployment functionality that is specific to the cartridge instance, code changes in the updated application code without a restart of the application.

9. The system of claim 8, wherein the processing device to provide the updated application code to the cartridge instance further comprises the processing device to call into cartridge hooks for each of the cartridge instance.

10. The system of claim 8, wherein the cartridge instance comprises at least one of a JBoss™ cartridge type, a PHP™ cartridge type, a Perl™ cartridge type, or a Ruby™ cartridge type.

11. The system of claim 10, wherein in response to any of the cartridge instance being the JBoss™ cartridge type, the hot deployment functionality comprises a JBoss™ HDScanner to:

identify the codes changes and redeploys the code changes in the application; and when previously-deployed artifacts are removed as part of the code changes, undeploy the previously-deployed artifacts.

12. The system of claim 10, wherein when the cartridge instance is the PHP™ cartridge type or the Perl™ cartridge type, the hot deployment functionality comprises the processing device to:

build the updated application code by processing dependencies and running user build action hooks; and deploy the built updated application code to the application without restarting the application.

13. The system of claim 8, wherein in response to the cartridge instance being the Ruby™ cartridge type, the hot deployment functionality comprises accessing a Passenger™ restart.txt file and causing the application to serve the code changes without restarting the application.

14. The system of claim 8, wherein in response to the marker file being not present in the updated application code, the processing device is further to invoke, by the cartridge instance, build functionality and deployment functionality to implement the code changes without the hot deployment functionality.

15. A non-transitory machine-readable storage medium including instructions that, when accessed by a processing device, cause the processing device to:

receive, by the processing device executing a virtual machine (VM) of a multi-tenant Platform-as-a-Service (PaaS) system, updated application code of an application executed on the VM, the updated application code sent to a source code management (SCM) repository maintained at the VM, wherein the VM hosts multiple applications that are each owned by different owners;

provide, by the processing device, the updated application code to a cartridge instance that implements framework of the application on the VM, wherein the cartridge instance provides at least one of configuration templates, configuration scripts, or dependencies to execute source code of the application on the VM and wherein the cartridge instance is deployed on the VM from a master cartridge maintained by the multi-tenant PaaS;

determine, by the processing device via the cartridge instance, that a marker file is present in the updated application code, the marker file indicating that hot deployment functionality is to be implemented for the application; and implement, by the processing device using the hot deployment functionality that is specific to the cartridge instance, code changes in the updated application code without a restart of the application.

16. The non-transitory machine-readable storage medium of claim 15, wherein the processing device to provide the updated application code to the cartridge instance further comprises the processing device to call into cartridge hooks the cartridge instance.

17. The non-transitory machine-readable storage medium of claim 15, wherein the cartridge instance comprise at least one of a JBoss™ cartridge type, a PHP™0 cartridge type, a Perl™ cartridge type, or a Ruby™ cartridge type.

18. The non-transitory machine-readable storage medium of claim 17, wherein in response to the cartridge instance being the JBoss™ cartridge type, the hot deployment functionality comprises a JBoss™ HDScanner to:

identify the codes changes and redeploys the code changes in the application; and when previously-deployed artifacts are removed as part of the code changes, undeploy the previously-deployed artifacts.

19. The non-transitory machine-readable storage medium of claim 15, wherein in response to the marker file being not present in the updated application code, the processing device further to invoke, by the cartridge instance, build functionality and deployment functionality to implement the code changes without the hot deployment functionality.

20. The non-transitory machine-readable storage medium of claim 15, wherein in response to the cartridge instance being the Ruby™ cartridge type, the hot deployment functionality comprises accessing a Passenger™ restart.txt file and causing the application to serve the code changes without restarting the application.

* * * * *